(12) United States Patent
Looney

(10) Patent No.: US 6,427,958 B1
(45) Date of Patent: Aug. 6, 2002

(54) QUICK RELEASE BRACKET FOR ANIMAL FEEDING DEVICES

(75) Inventor: Jack Looney, Napa, CA (US)

(73) Assignee: Lixit Corporation, Napa, CA (US)

( * ) Notice: Subject to any disclaimer, the term of this patent is extended or adjusted under 35 U.S.C. 154(b) by 0 days.

(21) Appl. No.: 09/618,908

(22) Filed: Jul. 18, 2000

(51) Int. Cl.$^7$ .......................... A01K 39/01; A47G 29/00
(52) U.S. Cl. ................................. 248/220.21; 119/477
(58) Field of Search .............. 211/106, 96; 248/220.21, 248/311.3, 313, 221.21; 119/452, 454, 456, 462, 464, 465, 467, 475, 477, 478, 51.5, 58, 60, 174; 403/321, 322.1, 322.4, 323, 322.3, 324; 292/359, DIG. 17, 68, 42, 38, 30

(56) References Cited

U.S. PATENT DOCUMENTS

| | | | | |
|---|---|---|---|---|
| 1,955,969 A | * | 4/1934 | Marzolf ........................ 287/58 |
| 2,316,692 A | * | 4/1943 | Hill .............................. 292/171 |
| 2,955,859 A | * | 10/1960 | Krause et al. .................. 292/6 |
| 3,039,837 A | * | 6/1962 | Poe ............................ 312/320 |
| 3,645,234 A | * | 2/1972 | Schroer ........................ 119/18 |
| 3,707,949 A | * | 1/1973 | Lippi ........................... 119/18 |
| 4,340,144 A | * | 7/1982 | Cousins ................... 211/87.01 |
| 4,456,289 A | * | 6/1984 | Badiali ......................... 292/28 |
| 4,474,492 A | * | 10/1984 | Fleitas ......................... 403/322 |
| 4,507,010 A | * | 3/1985 | Fujiya ......................... 403/322 |
| 4,582,446 A | * | 4/1986 | Salice ......................... 403/322 |
| 4,674,777 A | * | 6/1987 | Guelck ........................ 292/101 |
| 4,807,567 A | * | 2/1989 | Atchley ....................... 119/18 |
| 4,821,678 A | * | 4/1989 | Atchley ....................... 119/18 |
| 4,875,724 A | * | 10/1989 | Gruber ........................ 292/216 |
| 5,127,684 A | * | 7/1992 | Klotz et al. .................. 292/113 |
| 5,301,634 A | * | 4/1994 | Ho .............................. 119/18 |
| 5,351,645 A | * | 10/1994 | Brennon ....................... 119/18 |
| 5,447,118 A | * | 9/1995 | Huff et al. ................... 119/118 |
| 5,538,150 A | * | 7/1996 | Perkins ....................... 292/216 |
| 5,549,074 A | * | 8/1996 | Hui ............................. 119/477 |
| 5,669,329 A | * | 9/1997 | Krause ........................ 119/72.5 |
| 6,142,100 A | * | 11/2000 | Marchioro .................. 119/72.5 |
| 6,189,489 B1 | * | 2/2001 | Pearce ........................ 119/477 |

* cited by examiner

Primary Examiner—Daniel P. Stodola
Assistant Examiner—Jennifer E. Novosad
(74) Attorney, Agent, or Firm—Harris Zimmerman, Esq.

(57) ABSTRACT

A system for supporting a wide range of animal feeding devices includes a bracket assembly having a mounting plate with one surface adapted to impinge on the wall of the animal enclosure. A mounting hole extends through a medial portion of the mounting plate. The mounting hole is generally rectangular, and includes a flange projecting upwardly at the lower edge thereof. A latch lever is pivotally secured to the plate by a pivot pin adjacent to one side of the mounting hole, and includes an actuating end extending laterally beyond the side edge of the mounting plate. A curved slot is disposed adjacent to the other side of the mounting hole, extending in an arc centered at the pivot pin. A slot pin extends from the lever to ride in the curved slot, and is retained therein. The feeding containers are each provided with a mounting lug extending from a sidewall portion thereof. The mounting lug includes a short stem portion and a wider, distal head portion. The head portion is dimensioned to extend through the mounting hole with limited clearance, and a curved edge portion of the latch lever is configured to engage and grip the upper surface of the stem portion of the mounting lug against the lower edge of the mounting hole. The mounting plate is secured to a wire cage wall by a screw extending to a backing plate, or is secured to a solid cage wall by adhesive, double-sided tape, and the like.

22 Claims, 5 Drawing Sheets

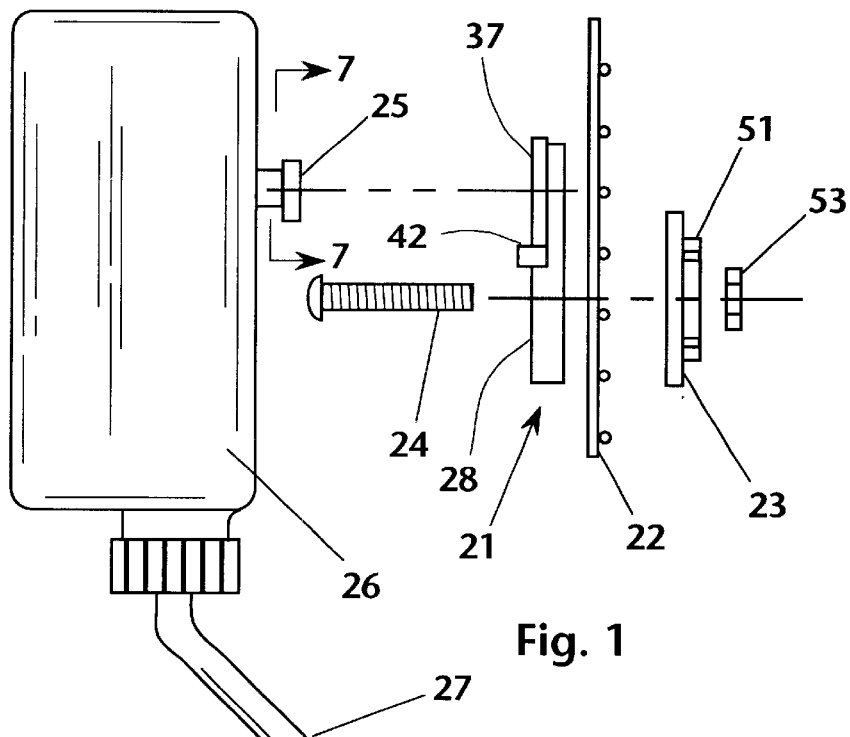
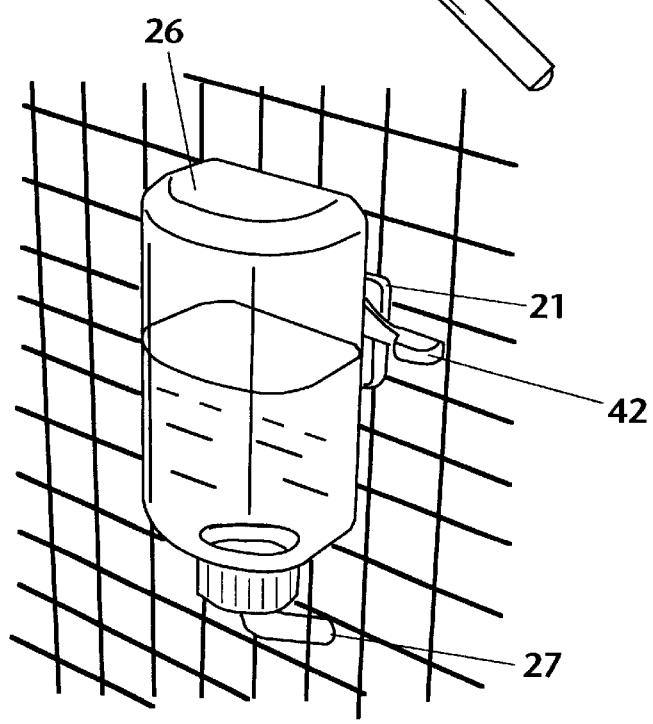
Fig. 1
Fig. 2

QUICK RELEASE BRACKET FOR ANIMAL FEEDING DEVICES

BACKGROUND OF THE INVENTION

This invention relates to animal feeding devices, and, more particularly, to a system for supporting animal feeding devices for caged animals.

Animal feeding devices were initially developed as a means for tending caged laboratory animals in a cost-effective manner. A common design that has evolved for water delivery includes an inverted bottle having a depending outlet spout, and some form of metering device that emits water when touched or licked by the animal. Often, the bottle is secured to the exterior of a wire cage or the like, and the depending spout extends obliquely through the cage wall to be accessible to the animal. Animal feed is generally provided in a dish or cup that is similarly suspended from the wire cage. In either case, the water bottle or dish is periodically removed, cleaned, and refilled to assure a steady supply of food and water to the animal. Given the fact that a large number of animals may be under care at a single installation, it is desirable to employ a support system for the watering and feeding containers that is as inexpensive as possible, while also being as easy and quick to operate as possible. Any advance in these regards comprises a considerable advance in the art.

SUMMARY OF THE INVENTION

The present invention generally comprises a system for supporting a wide range of animal feeding devices on the wall of the enclosure that accommodates the animal. A salient feature of the support system is that the animal feeding device is easily removed and replaced, thus expediting the feeding tasks associated with maintaining an animal in an enclosure. Furthermore, the support system is simple and inexpensive, and is thus cost-effective for large-scale animal facilities.

A primary component of the feeding device support system of the invention is a bracket assembly. The bracket assembly includes a mounting plate having one surface adapted to impinge on the wall of the animal enclosure. If the enclosure is a wire cage, there is provided a backing panel disposed to impinge on the inner surface of the cage wall, and a threaded fastener joins the mounting plate to the backing plate with the cage wall disposed therebetween, thus forming a semi-permanent mounting on the animal enclosure. If the enclosure includes solid walls or glass walls, the mounting plate is secured within the enclosure by double-sided adhesive tape or the like applied to the interior surface of the solid wall or glass wall.

The mounting plate includes a mounting hole extending through a medial portion thereof. The mounting hole is generally rectangular, and includes a flange projecting upwardly at the lower edge thereof. A latch lever is pivotally secured to the plate by a pivot pin adjacent to one side of the mounting hole, and includes an actuating end extending laterally beyond the side edge of the mounting plate. A curved slot is disposed adjacent to the other side of the mounting hole, extending in an arc that is centered at the pivot pin. A slot pin extends from the lever to ride in the curved slot, and is retained therein by a flange extending from the slot pin and received in a mortised opening of the slot. The surface of the mounting plate that includes the mounting hole, pivot pin, slot, and lever is inset with respect to the remainder of the plate surface, so that the lever is disposed substantially flush with the plate surface.

The food and water service containers furnish according to the invention are each provided with a mounting lug extending from a sidewall portion thereof. The mounting lug includes a short stem portion extending from the sidewall, and a head portion joined to the distal end of the stem portion. Both the head and stem are provided with similar cross-sectional profiles: an arcuate upper side joined to depending sides, and a lower edge extending linearly between the depending sides. The head portion is somewhat greater in width and height, and defines a flange extending laterally from the stem portion. The head portion is dimensioned to extend through the mounting hole with limited clearance. The flange at the lower edge of the mounting hole is received between head of the mounting lug and the sidewall of the container. Likewise, the latch lever is dimensioned in thickness to be received between the head of the mounting lug and the sidewall of the container.

The latch lever includes a curved edge portion that is configured to engage the arcuate upper surface of the stem portion of the mounting lug. The curved edge portion is formed and positioned so that the lever is rotatable into a latched position in which the curved edge portion fully engages the arcuate upper surface of the mounting lug stem, and the flange of the mounting hole is engaged between the lug head and the sidewall of the container. The mounting lug is thus tightly gripped, and the container is rigidly secured to the mounting plate. In the latched position, the slot pin is disposed at one end of the curved slot. The latch lever may be rotated about the pivot pin to an open position, in which the slot pin is disposed at the other end of the curved slot and the curved edge portion of the lever is free of the mounting lug of the container. In this open lever position the mounting lug may be inserted or removed with respect to the mounting hole. Thus flipping the latch lever through an angular excursion of approximately 20° is sufficient to secure a feeding container, or release, remove, and replace a feeding container.

BRIEF DESCRIPTION OF THE DRAWINGS

FIG. 1 is an exploded side elevation of one embodiment of the quick release bracket mounting system, shown in conjunction with a depending water bottle for animal watering.

FIG. 2 is a perspective view of the embodiment of the quick release mounting bracket shown in FIG. 1.

DESCRIPTION OF THE PREFERRED EMBODIMENT

Figure 3:
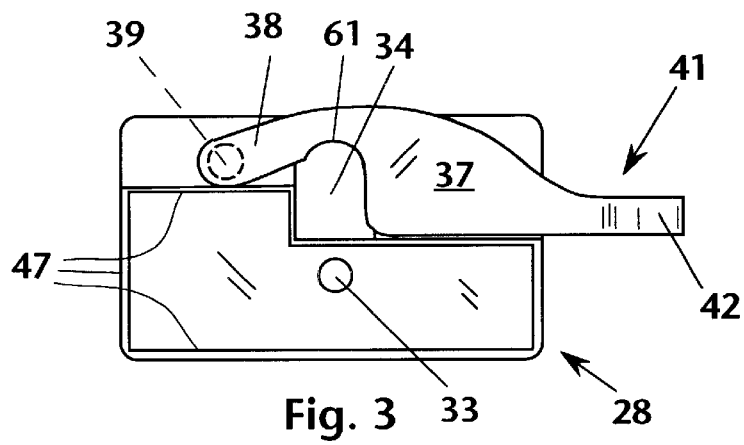
FIG. 3 is a front view of the mounting bracket assembly of the invention.

The present invention generally comprises a system for supporting a wide range of animal feeding devices on the wall of the enclosure that accommodates the animal. In one embodiment of the invention, shown in FIGS. 1 and 2, a mounting bracket assembly 21 is secured to a wire cage wall 22 by a backing plate 23 and a threaded fastener 24 extending through the assembly 21 and wall 22 and through the backing plate 23. An animal supply container, such as the inverted water bottle assembly 26, is provided with a mounting lug 25 extending from a sidewall thereof, the lug 25 being dimensioned to be releasably supported by the mounting bracket assembly 21, as will be described below. The mounting bracket assembly 21 is disposed on the exterior surface of the cage wall 22, and the water bottle assembly 26 includes a water delivery tube 27 depending obliquely downwardly and adapted to extend through the wire cage wall to be accessible by the animal residing therein.

Figure 4:
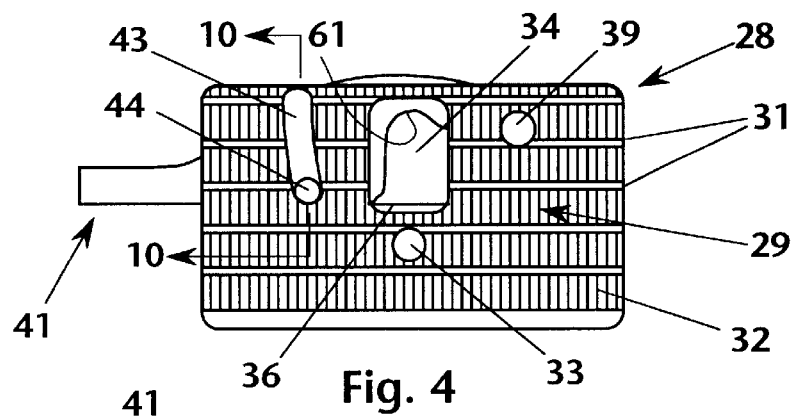
FIG. 4 is a rear view of the mounting bracket assembly shown in FIG. 1.
Figure 5:
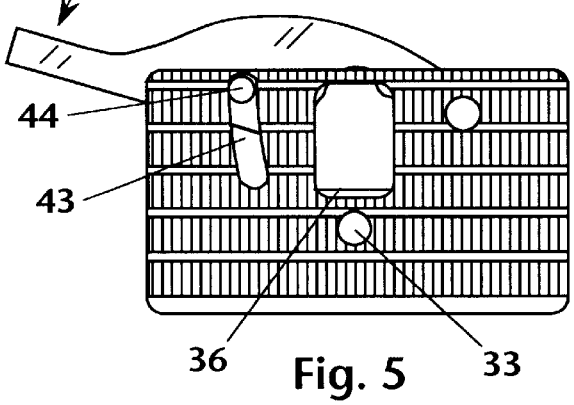
FIG. 5 is a rear view of the mounting bracket assembly of FIGS. 3 and 4, shown with the latch lever in the open position.
Figures 8, 9:
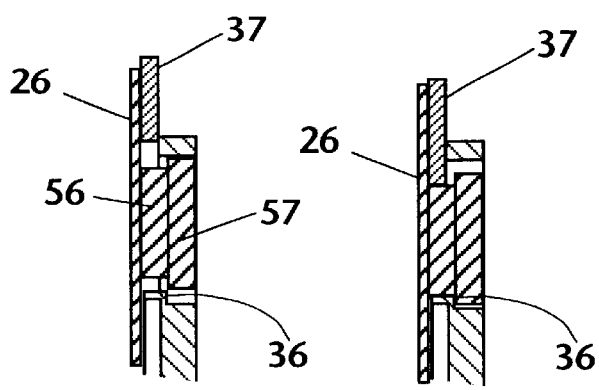
FIG. 8 is an enlarged cross-sectional end view of the lug engagement in the mounting bracket assembly, shown with the lug freely received in the mounting hole of the bracket.
FIG. 9 is an enlarged cross-sectional view as in FIG. 8, showing the latch lever securing the mounting lug in the mounting hole.

With regard to FIGS. 3–5, the mounting bracket assembly 21 is comprised of a plate 28 having a generally rectangular configuration, although this shape is not a limiting factor. The plate 28 is provided with a rear surface 29 that includes horizontal grooves 31 adapted to received the horizontal wires of a wire cage wall, and vertical striations 32 adapted to engage the vertical wires of the cage wall. A screw hole 33 extends through a lower medial portion of the plate 28. A mounting hole 34 extends through an upper medial portion of the plate 28. The mounting hole 34 is generally rectangular, and includes a flange 36 projecting upwardly at the lower edge thereof, as also shown in FIGS. 8 and 9.

The mounting bracket assembly further includes a latch lever 37 having a proximal dogleg end 38 pivotally joined to the plate 28 by a pivot pin 39 disposed adjacent to one side of the mounting hole 34. The pin 39 is generally orthogonal to the plate 28, and the lever 37 is constrained to pivot in an arc disposed within a plane parallel to the plate 28. The distal end 41of the latch lever 37 is provided with a tab feature 42 to facilitate manual engagement thereof. A curved slot 43 is formed in the plate 28 adjacent to the other side of the mounting hole 34, the slot 43 extending in an arc that is centered at the axis of the pivot pin 39. With regard to FIGS. 4, 5, and 10, a slot pin 44 extends from the latch lever 37 into the curved slot 43, and is slidably secured therein by a flange 46 extending laterally from the head of the pin 44 and received in a mortised edge of the slot 43. The slot pin 44 thus constrains the latch lever 37 to pivot between a closed, downward disposition, shown in FIG. 4, and an upward, open disposition, shown in FIG. 5.

Figure 10:
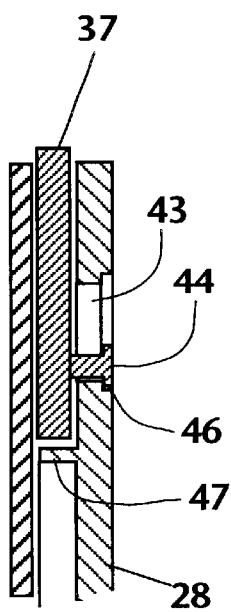
FIG. 10 is an enlarged cross-sectional end view showing the engagement of the slot pin in the arcuate slot of the mounting bracket assembly.
Figure 11:
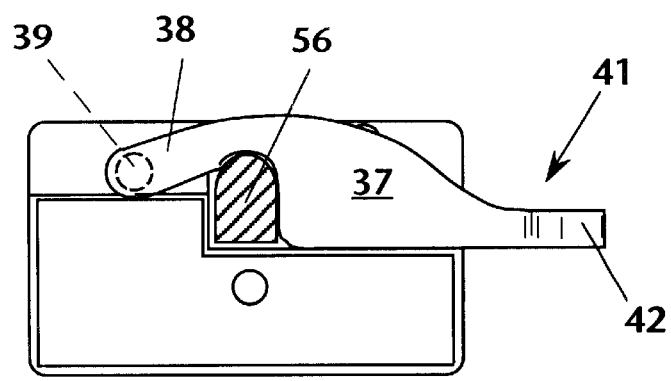
FIG. 11 is a front view of the mounting bracket assembly, shown with the latch lever securing a mounting lug.

With regard to FIGS. 3 and 10, the front surface of the plate 28 is provided with a flange 47 extending continuously in rectangular fashion about the lower edge and laterally opposed side edges below the mounting hole 34. The flange 47 provides enhanced rigidity to the plate 28, and further permits the front surface of the latch lever 37 to be substantially flush with the outer extent of the flange 47.

Figure 6:
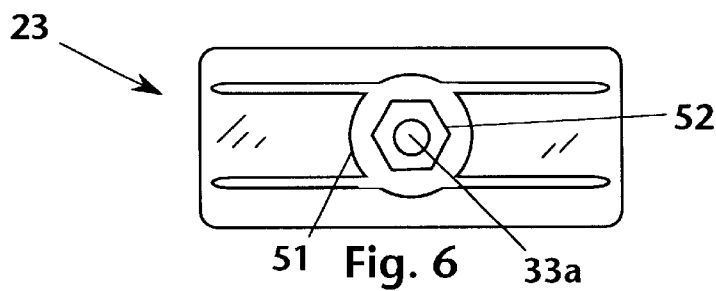
FIG. 6 is a plan view of the backing panel of the mounting bracket assembly of claim 3–5.

With regard to FIGS. 1 and 6, the backing plate 23 includes a boss 51 through which a screw hole 33a extends coaxially. The boss 51 includes an hexagonal inset 52 to secure a hex nut 53 for engaging the threaded fastener 24.

Figure 7:
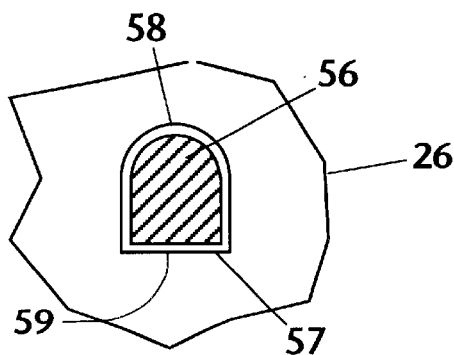
FIG. 7 is an enlarged cross-sectional elevation of the mounting lug provided on the animal feeding and watering containers, taken along line 7—7 of FIG. 1.

The lug 25 of the inverted water bottle 26, depicted in FIGS. 7–9, includes a stem portion 56 extending from the sidewall of the bottle 26, and a head portion 57 joined integrally to the distal end of the stem portion. Both the head and stem portions are provided with similar cross-sectional profiles: an arcuate upper side 58 joined to depending sides, and a lower edge extending linearly between the depending sides to define a rectangular profile 59. The head portion 57 is dimensioned to extend through the mounting hole 34 with limited clearance, as shown in FIG. 8. The flange 36 at the lower edge of the mounting hole 34 is received between head portion 58 of the mounting lug and the sidewall of the container, as shown in FIG. 9.

It is significant to note that the latch lever is provided with a curved edge portion 61 at the junction of the dogleg portion 38 and the medial portion of the lever 37. The curved edge portion is configured and dimensioned to engage the curved upper side of the stem portion 56 of the mounting lug. The important aspects of the lug head 25 are that it provides an upper slot or channel that receives the curved edge portion 61 of the latch lever, and it provides a lower slot or channel that receives the flange 36 of the mounting hole 34. This engagement is effected when the lever 37 is moved to the downward, closed position shown in FIGS. 4 and 9. In this engaged, latched position, the latch lever impinges on the stem portion 56 of the lug and urges the flange 36 to be received between the head portion and the sidewall. The stem portion is tightly gripped between the curved edge portion 61 of the latch lever and the flange 36, thus supporting the bottle 26 or any other animal feeding or watering device equipped with a mounting lug 25. Conversely, when the latch lever is rotated to the open position of FIGS. 5 and 8, the mounting lug 25 of a food service container may be easily removed from or placed in the mounting hole 34.

Returning to FIG. 1, the invention may be employed by first securing the mounting bracket assembly to the wire cage wall 22. A threaded fastener 24 is passed through the front opening of hole 33, through the cage wall 22, and through the hole 33a of the backing plate 23. The nut 53 is secured in the hexagonal receptacle 52, and the fastener 24 is tightened to compress the cage wall 22 between the backing plate 23 and the plate 28. The lever 37 is then rotated to the open position, the lug 25 is inserted in the mounting hole 34, and the lever 37 is moved to the closed, latched position of FIGS. 4 and 9. The container 26 is thus supported adjacent to the exterior of the cage wall 22, and the water delivery tube is positioned to extend through the cage wall to be accessible by the animal residing in the enclosure. This mounted assembly appears in FIG. 2.

Figure 12:
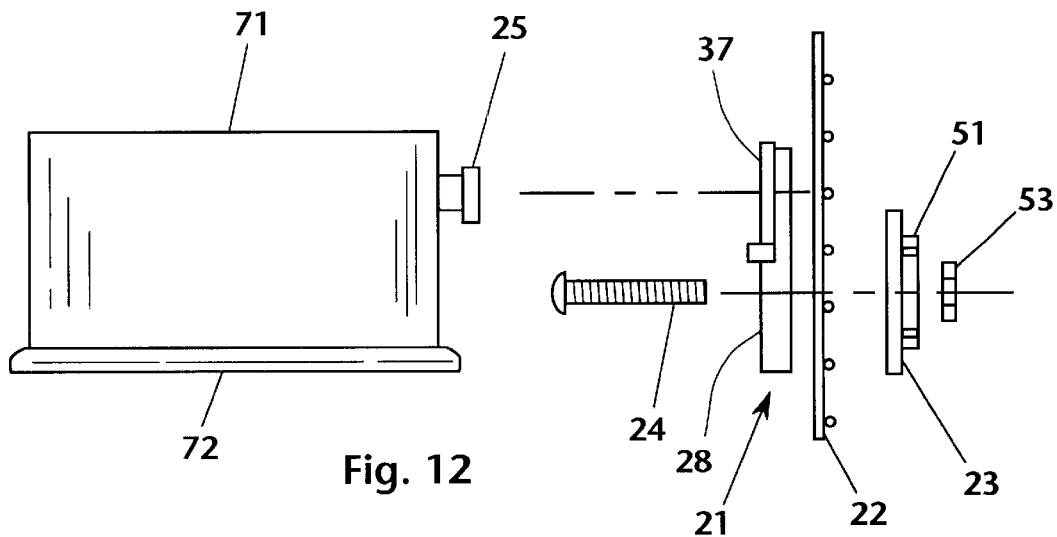
FIG. 12 is an exploded side elevation showing the mounting bracket of the invention used with an animal feeding dish of the invention.
Figure 13:
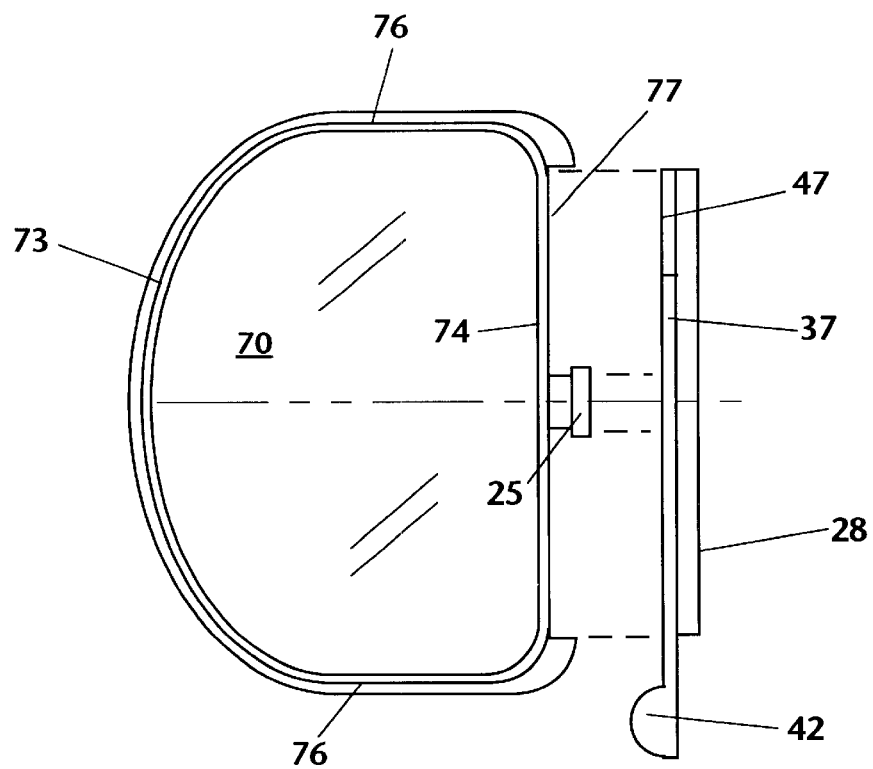
FIG. 13 is a top view of the embodiment depicted in FIG. 12.

With regard to FIGS. 12 and 13, a further embodiment of the invention provides a food serving container supported by the mounting bracket 21 assembled as described with reference to FIG. 1. A food serving container includes a closed curved sidewall 71 and a bottom panel 70 spanning the lower edge of the sidewall 71 to form a cup-like container. The sidewall 71 includes a curved portion 73 opposite a planar portion 74, and a pair of parallel, spaced apart panels 76 joining the portions 73 and 74. A quarter-round flange 72 extends continuously about the lower edge junction of the side panels 76 and curved portion 73 with the bottom panel 70. Note that the flange 73 does not extend to the planar portion 74 of the sidewall. The opposed ends of the flange 73 at the planar portion 74 define a receptacle 77 in which the mounting bracket assembly 21, and, in particular, the lower side portions of the plate 28, are received when the lug 25 is secured in the mounting hole 34 of the assembly 21. The engagement of the plate 28 in the receptacle 77 prevents rotation of the container, thereby preventing spillage of food from the container. At the same time, the quick release latch lever permits quick removal and replacement of the container, minimizing the time required for feeding each animal.

Figure 14:
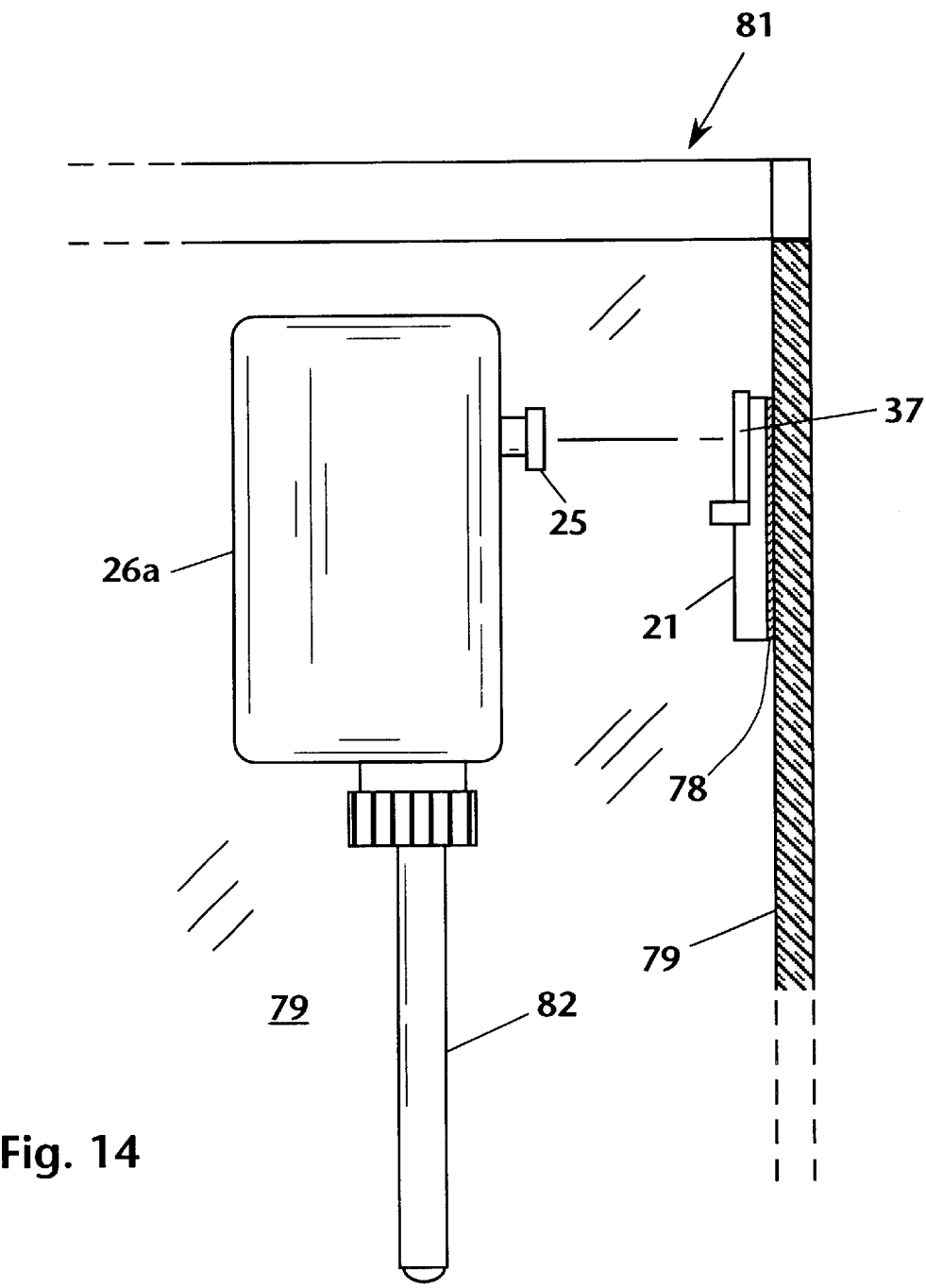
FIG. 14 is a side elevation depicting a further embodiment of the invention in which a watering bottle is supported by a mounting bracket assembly secured to the interior surface of a solid enclosure wall.

With regard to FIG. 14, another embodiment of the invention provides an inverted water bottle 26a supported within an enclosure 81 having solid walls 79, such as a terrarium or aquarium or the like. In this embodiment the backing plate 23 and threaded fastener are omitted. Rather, the plate 28 of the assembly 21 is secured to the interior surface of the wall 79 using adhesive, such as double-sided adhesive tape that is commonly available, silicone rubber adhesive, and the like. Thereafter, the lug 25 protruding from the sidewall of the bottle 26a is secured in the mounting bracket assembly 21, as described previously, and the water delivery tube 82 may supply water to small animals within the enclosure 81.

In all of the embodiments described herein, the tab end 42 of the latch lever 37 extends laterally beyond the profile of the food container (26, 26a, or 70), so that the lever may be manually rotated easily.

It may be appreciated that the various features of the various embodiments described herein may be combined in any manner appropriate to the type of food service container and cage construction. Furthermore, animal furnishings other than food service containers may be supported by the quick release bracket of the invention, and may include animal toys, instrumentation, or the like. The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A system for supporting an object on an upright structure, including:
   a bracket assembly and means for securing said bracket assembly to said upright structure, said bracket assembly including a mounting plate having a mounting hole extending therethrough;
   an object including a mounting lug extending therefrom, said mounting lug being dimensioned to extend through said mounting hole with limited clearance;
   said bracket assembly further including latch means for releasably securing said mounting lug in said mounting hole, whereby said object is removably supported by said mounting plate;
   wherein said latch means includes a latch lever pivotally secured to said mounting plate, said latch lever extending in a plane generally parallel to said mounting plate.

2. The system of claim 1, wherein said mounting lug includes an upper channel portion for receiving and engaging a portion of said latch lever.

3. The system of claim 2, wherein said mounting plate has a flange extending along a margin of said mounting hole and wherein said mounting lug includes a lower channel portion for receiving and engaging said flange.

4. The system of claim 1, further including a curved slot extending through said mounting plate adjacent to said latch lever, and a slot pin extending from said latch lever and secured in said curved slot and disposed to translate therealong.

5. The system of claim 4, wherein said latch lever is pivotable from a closed position, in which said slot pin is disposed at one end of said curved slot, to an open position in which said slot pin is disposed at the opposed end of said curved slot.

6. The system of claim 5, wherein said latch lever includes an edge portion configured to engage and retain said mounting lug when said latch lever is disposed in said closed position.

7. The system of claim 1, wherein said object comprises an animal food service container.

8. The system of claim 1, wherein said mounting lug includes a stem portion extending from said object, and a head portion extending from the distal end of said stem portion, said head portion being generally wider than said stem portion.

9. The system of claim 8, wherein said latch lever includes an edge portion dimensioned to be received between said head portion and said object from which the lug extends, when said lug is disposed in said mounting hole.

10. The system of claim 1, wherein said means for securing said bracket assembly includes a backing plate, and a threaded fastener extending through said mounting plate and secured to said backing plate.

11. The system of claim 10, wherein said object includes a wall, said mounting plate is disposed at the outer surface of said wall, and said threaded fastener extends through said wall to said backing plate at the inner surface of said wall.

12. The system of claim 1, wherein said object includes a wall and said means for securing said bracket assembly includes adhesive means for joining said mounting plate to said wall.

13. The system of claim 12, wherein said adhesive means includes double-sided adhesive tape applied between said mounting plate and said wall.

14. A system for supporting an animal food service container on a wall of an animal enclosure, including:
   a bracket assembly and means for securing said bracket assembly to the wall, said bracket assembly including a mounting plate having a mounting hole extending therethrough;
   a container including a mounting lug extending therefrom, said mounting lug being dimensioned to extend through said mounting hole with limited clearance;
   said bracket assembly including latch means for releasably securing said mounting lug in said mounting hole whereby said container is removably supported by said mounting plate
   wherein said latch means includes a latch lever pivotally secured to said mounting plate, said latch lever extending in a plane generally parallel to said mounting plate.

15. The system of claim 14 wherein said container includes an inverted water bottle having a water delivery tube oriented to extend into said enclosure when said mounting plate is disposed at the exterior of the enclosure wall.

16. The system of claim 14, wherein said container includes a food dish.

17. The system of claim 16, wherein said food dish includes a closed curved sidewall, and said mounting lug extends outwardly from said sidewall.

18. A system for supporting an animal food service container on a wall of an animal enclosure, including:
- a bracket assembly and means for securing said bracket assembly to the wall, said bracket assembly including a mounting plate having a mounting hole extending therethrough;
- a container including a mounting lug extending therefrom, said mounting lug being dimensioned to extend through said mounting hole with limited clearance;
- said bracket assembly including latch means for releasably securing said mounting lug in said mounting hole, whereby said container is removably supported by said mounting plate;
- wherein said latch means includes a latch lever pivotally joined to said mounting plate adjacent to one side of said mounting hole.

19. The system of claim 18, wherein said mounting plate includes a curved slot adjacent to the other side of said mounting hole in said mounting plate, and a slot pin extending from said latch lever and disposed to ride in said curved slot.

20. The system of claim 18, said mounting lug including a stem portion extending from said container, and a head portion extending from the distal end of said stem portion, said head portion being generally wider than said stem portion.

21. The system of claim 18, wherein said latch lever includes an edge portion dimensioned to be received between said head portion and said container from which the lug extends, when said lug is disposed in said mounting hole and said lever is rotated to a closed position.

22. The system of claim 21, wherein said mounting hole includes a flange projecting from an edge portion thereof and disposed to be received between said head portion and said container, when said lug is disposed in said mounting hole and said lever is rotated to a closed position.

* * * * *